US009457759B2

United States Patent
Sugimoto et al.

(10) Patent No.: US 9,457,759 B2
(45) Date of Patent: Oct. 4, 2016

(54) AIRBAG AND AIRBAG DEVICE

(71) Applicant: TAKATA CORPORATION, Tokyo (JP)

(72) Inventors: Shinichi Sugimoto, Hikone (JP); Daisuke Shibata, Omihachiman (JP)

(73) Assignee: TAKATA CORPORATION (JP)

( * ) Notice: Subject to any disclaimer, the term of this patent is extended or adjusted under 35 U.S.C. 154(b) by 0 days.

(21) Appl. No.: 14/709,620

(22) Filed: May 12, 2015

(65) Prior Publication Data

US 2015/0321638 A1 Nov. 12, 2015

(30) Foreign Application Priority Data

May 12, 2014 (JP) .................. 2014-098304

(51) Int. Cl.
| | |
|---|---|
| *B60R 21/233* | (2006.01) |
| *B60R 21/261* | (2011.01) |
| *B60R 21/239* | (2006.01) |
| *B60R 21/231* | (2011.01) |
| *B60R 21/2338* | (2011.01) |

(52) U.S. Cl.
CPC .......... *B60R 21/233* (2013.01); *B60R 21/239* (2013.01); *B60R 21/2338* (2013.01); *B60R 21/23138* (2013.01); *B60R 21/261* (2013.01); *B60R 2021/23146* (2013.01); *B60R 2021/23324* (2013.01); *B60R 2021/23382* (2013.01); *B60R 2021/2617* (2013.01)

(58) Field of Classification Search
CPC . B60R 21/233; B60R 21/239; B60R 21/261; B60R 2021/2617; B60R 21/23138; B60R 2021/23382
See application file for complete search history.

(56) References Cited

U.S. PATENT DOCUMENTS

| | | | |
|---|---|---|---|
| 6,648,371 B2 | 11/2003 | Vendely et al. | |
| 7,431,329 B2 * | 10/2008 | Taguchi | ............ B60R 21/23138 280/729 |
| 7,637,530 B2 * | 12/2009 | Yamaji | ............. B60R 21/23138 280/730.2 |
| 7,845,681 B2 | 12/2010 | Abe et al. | |
| 8,480,124 B2 | 7/2013 | Rickenbach et al. | |
| 8,596,678 B2 * | 12/2013 | Ravenberg | ........ B60R 21/23138 280/729 |
| 2004/0130135 A1 | 7/2004 | Ekdahl | |
| 2008/0290637 A1 | 11/2008 | Mueller et al. | |
| 2009/0121461 A1 | 5/2009 | Abe et al. | |

(Continued)

FOREIGN PATENT DOCUMENTS

| | | |
|---|---|---|
| JP | 2009-6874 A | 1/2009 |
| JP | 2009-40260 A | 2/2009 |

(Continued)

*Primary Examiner* — Faye M Fleming
(74) *Attorney, Agent, or Firm* — Fitch Even Tabin & Flannery LLP

(57) ABSTRACT

To provide an airbag and an airbag device that can keep the internal pressure of the airbag in the initial stage of inflation and deployment high. An airbag includes a first chamber and a second chamber. The first chamber includes a nozzle forming a flow path capable of communicating with the second chamber, and a tether connecting the inner surface of the nozzle and the inner surface of the first chamber. During the inflation and deployment of the first chamber, the supply of gas to the second chamber is prevented by retracting the nozzle into the first chamber. After the first chamber is expelled into the cabin and when a predetermined external pressure is loaded on the first chamber, the nozzle is expelled into the second chamber so as to allow gas to be supplied to the second chamber.

12 Claims, 6 Drawing Sheets

(56) References Cited

U.S. PATENT DOCUMENTS

| | | |
|---|---|---|
| 2009/0212538 A1 | 8/2009 | Abe et al. |
| 2010/0032931 A1 | 2/2010 | Kumagai et al. |
| 2010/0102542 A1 | 4/2010 | Nakajima et al. |
| 2010/0133798 A1 | 6/2010 | Fukawatase et al. |
| 2011/0101652 A1 | 5/2011 | Abe |
| 2015/0076803 A1* | 3/2015 | Fujiwara ............... B60R 21/207 280/730.2 |

FOREIGN PATENT DOCUMENTS

| | | |
|---|---|---|
| JP | 2009-113757 A | 5/2009 |
| JP | 2009-196596 A | 9/2009 |
| JP | 2010-36770 A | 2/2010 |
| JP | 2010-116010 A | 5/2010 |
| JP | 2010-535121 A | 11/2010 |
| JP | 5286789 B2 | 6/2013 |
| JP | 5389451 B2 | 10/2013 |

* cited by examiner

AIRBAG AND AIRBAG DEVICE

CROSS-REFERENCE TO RELATED APPLICATION

This application is based upon and claims the benefit of priority from the prior Japanese Patent Application No. 2014-098304, filed on May 12, 2014, the entire contents of which are incorporated herein by reference.

FIELD OF THE INVENTION

The present invention relates to an airbag and an airbag device, and more specifically, it relates to an airbag and an airbag device suitable for a side airbag that is inflated and deployed between an occupant and a door portion.

BACKGROUND OF THE INVENTION

It has become common that vehicles such as automobiles are mounted with an airbag device for absorbing an impact on an occupant during an emergency such as a collision by inflating and deploying an airbag in the cabin. Such airbag device generally has an airbag that is normally housed in a folded state in a structure of a vehicle and is inflated and deployed in an emergency, and an inflator that supplies gas to the airbag.

For example, a side airbag that is inflated and deployed between an occupant and a door portion is embedded in a back portion (seat back) of a seat on which the occupant is seated, and breaks through or pushes aside the seat and is expelled forward into the cabin during a vehicle collision. Methods for preventing the increase of internal pressure when normal inflation and deployment of an airbag is interfered with in such a side airbag device have been proposed (see, for example, Japanese Unexamined Patent Application Publication No. 2010-535121).

The airbag described in Japanese Unexamined Patent Application Publication No. 2010-535121 has a front chamber and a rear chamber, and is configured such that, when gas is supplied from an inflator disposed in the rear chamber, gas is supplied to the front chamber through an opening formed in the rear chamber, and the airbag is inflated and deployed. A venting system including a vent hole and a closing panel is disposed in the front chamber. In the initial stage of inflation and deployment, the vent hole is not covered, so that gas can be vented. In the final stage of inflation and deployment, the vent hole is covered by the closing panel to prevent the venting of gas.

SUMMARY OF INVENTION

The above-described side airbag breaks through or pushes aside the seat and is expelled into the cabin during inflation and deployment. Therefore, in the initial stage of inflation and deployment, the internal pressure of the airbag is preferably kept high. However, since in the above-described airbag described in Japanese Unexamined Patent Application Publication No. 2010-535121, gas is vented to the outside from the initial stage of inflation and deployment, it is difficult to keep the internal pressure of the airbag high, and additional gas needs to be supplied. This causes an increase in power and size of the inflator.

The present invention is made in view of such a problem. It is an object of the present invention to provide an airbag and an airbag device that can keep the internal pressure of the airbag in the initial stage of inflation and deployment high.

The present invention provides an airbag that is normally housed in a folded state in a vehicle structure and is inflated and deployed with supply of gas in an emergency, the airbag including a first chamber at a first end of which an inflator supplying the gas is disposed, and a second chamber disposed at a second end of the first chamber, the first chamber including a nozzle forming a flow path capable of communicating with the second chamber, and a tether connecting the inner surface of the nozzle and the inner surface of the first chamber, wherein, during the inflation and deployment of the first chamber, the supply of gas to the second chamber is prevented by retracting the nozzle into the first chamber, and after the first chamber is expelled into the cabin and when a predetermined external pressure is loaded on the first chamber, the nozzle is expelled into the second chamber so as to allow gas to be supplied to the second chamber.

The present invention provides an airbag device that includes an airbag that is normally housed in a folded state in a vehicle structure and is inflated and deployed in an emergency, and an inflator that supplies gas to the airbag, wherein the airbag includes a first chamber of which the inflator is disposed at a first end, and a second chamber disposed at a second end of the first chamber, the first chamber includes a nozzle forming a flow path capable of communicating with the second chamber, and a tether connecting the inner surface of the nozzle and the inner surface of the first chamber, wherein during the inflation and deployment of the first chamber, the supply of gas to the second chamber is prevented by retracting the nozzle into the first chamber, and after the first chamber is expelled into the cabin and when a predetermined external pressure is loaded on the first chamber, the nozzle is expelled into the second chamber so as to allow gas to be supplied to the second chamber.

In the above-described airbag and the airbag device, the first chamber may have a guide portion that is disposed opposite to a sewn part of the tether such that the tether can be inserted through the guide portion. A first end of the tether may be sewn to the occupant side of the first chamber, and a second end of the tether may be sewn to the occupant side of the nozzle, and the guide portion may be disposed on the vehicle structure side of the first chamber. The nozzle may be folded and housed in a state retracted into the first chamber.

The second chamber may be formed into a bag shape by being sewn to the surface of the first chamber. The second chamber may have a vent hole through which gas can be vented to the outside. The vent hole may not be disposed on an extended line of the nozzle. The airbag may be a side airbag that is inflated and deployed between an occupant and a door portion.

According to the airbag and the airbag device according to the present invention, in the initial stage of inflation and deployment of the airbag, the nozzle supplying gas to the second chamber is retracted into the first chamber and the flow path is sealed; after the airbag is expelled into the cabin, and when a predetermined external force is loaded on the first chamber, the nozzle is expelled into the second chamber and the first chamber and the second chamber are made to communicate with each other so that the gas in the first chamber can be supplied to the second chamber; therefore, the internal pressure of the airbag in the initial stage of inflation and deployment can be kept high.

Therefore, wasteful supply of gas can be prevented, and the power and size of the inflator can be reduced.

BRIEF DESCRIPTION OF DRAWINGS

FIG. 1A shows a state where a nozzle is sealed, and FIG. 1B shows a state where the nozzle is open.

FIG. 2A shows a state before sewing, and FIG. 2B shows a state after sewing.

FIG. 3A shows a state before the sewing of the second chamber, and FIG. 3B shows a state after the sewing of the second chamber, and FIG. 3C shows a state where the nozzle is retracted.

FIG. 4A shows a normal state, and FIG. 4B shows the initial stage of inflation and deployment.

FIG. 5A shows an initial restrained state, and FIG. 5B shows an external pressure generating state.

DESCRIPTION OF THE PREFERRED EMBODIMENT

Figure 1A:
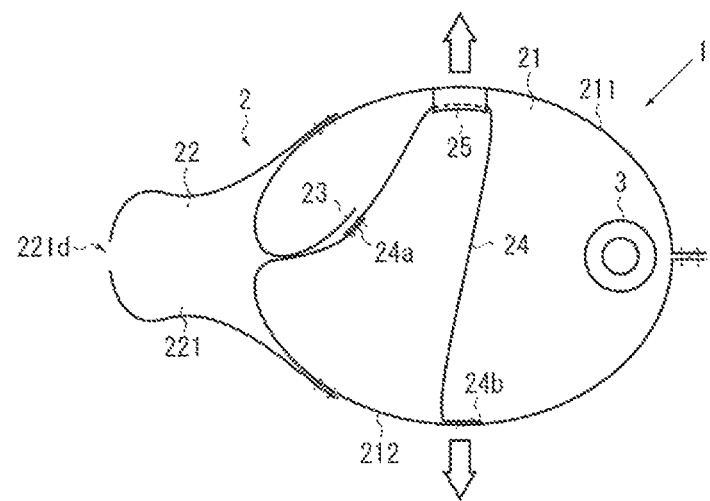
FIGS. 1A and 1B are sectional views showing an airbag device according to an embodiment of the present invention.
Figure 1B:
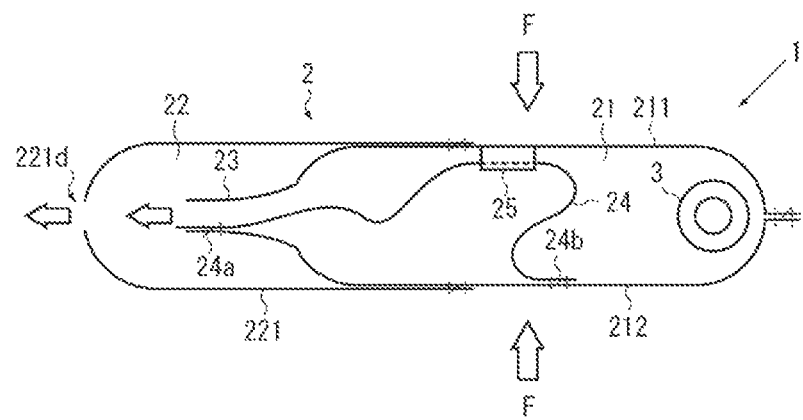
Figure 2A:
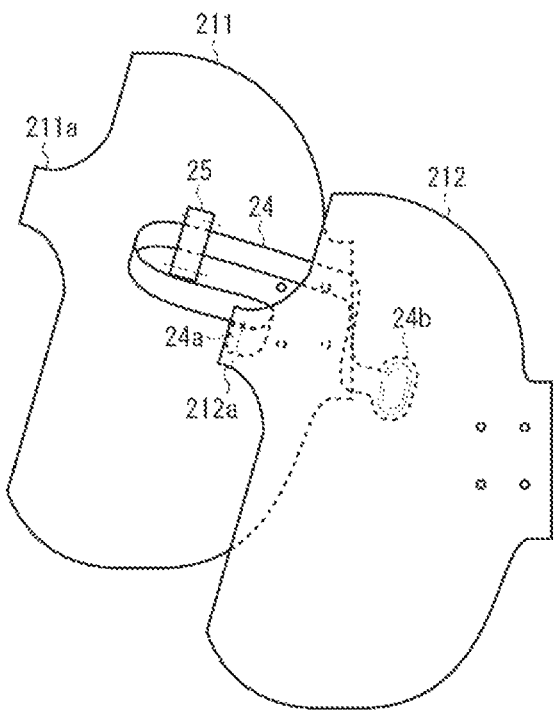
FIGS. 2A and 2B are plan views showing the first chamber shown in FIGS. 1A and 1B.
Figure 2B:
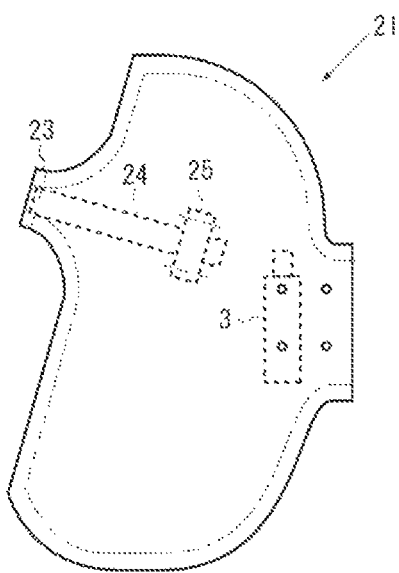
Figure 3A:
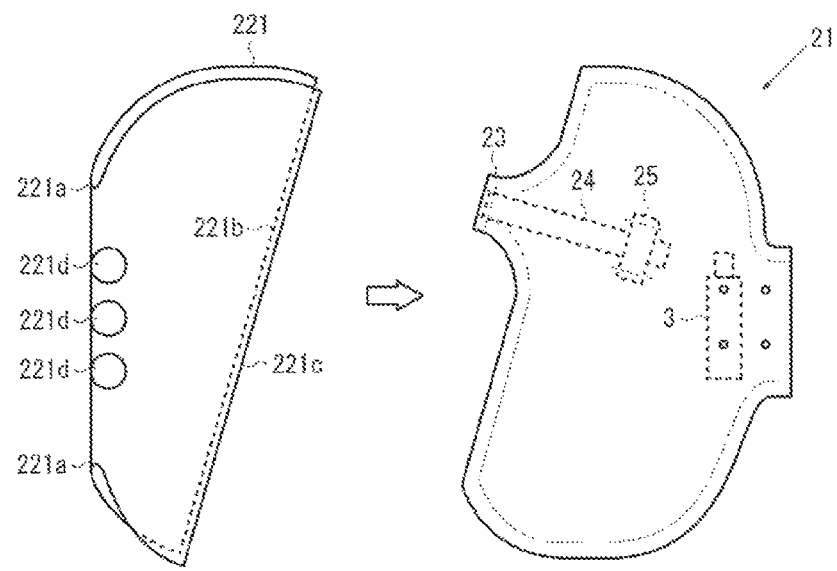
FIGS. 3A to 3C are a plan views showing the airbag shown in FIGS. 1A and 1B.
Figure 3B:
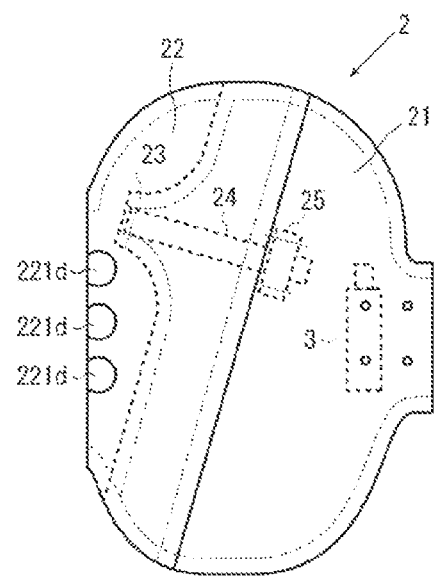
Figure 3C:
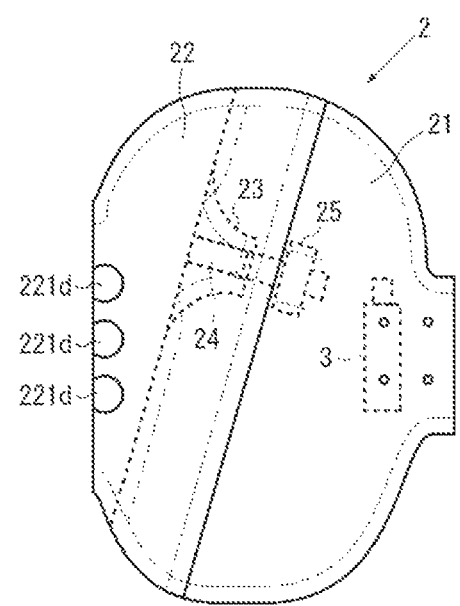

Embodiments of the present invention will now be described with reference to FIG. 1A to FIG. 5B. Here, FIGS. 1A and 1B are sectional views showing an airbag device according to an embodiment of the present invention, FIG. 1A shows a state where a nozzle is sealed, and FIG. 1B shows a state where the nozzle is open. FIGS. 2A and 2B are plan views showing the first chamber shown in FIGS. 1A and 1B. FIG. 2A shows a state before sewing, and FIG. 2B shows a state after sewing. FIGS. 3A to 3C are plan views showing the airbag shown in FIGS. 1A and 1B. FIG. 3A shows a state before the sewing of the second chamber, and FIG. 3B shows a state after the sewing of the second chamber, and FIG. 3C shows a state where the nozzle is retracted.

An airbag device 1 according to an embodiment of the present invention has, as shown in FIGS. 1A and 1B, an airbag 2 that is normally housed in a folded state in a structure of a vehicle and is inflated and deployed in an emergency, and an inflator 3 that supplies gas to the airbag 2. The airbag 2 has a first chamber 21 of which the inflator 3 is disposed at one end, and a second chamber 22 that is disposed at the other end of the first chamber 21. The first chamber 21 has a nozzle 23 that forms a flow path capable of communicating with the second chamber 22, and a tether 24 that connects the inner surface of the nozzle 23 and the inner surface of the first chamber 21. By retracting the nozzle 23 into the first chamber 21 during the inflation and deployment of the first chamber 21, the supply of gas to the second chamber 22 is prevented. After the first chamber 21 is expelled into the cabin, and when a predetermined external pressure is loaded on the first chamber 21, the nozzle 23 is expelled into the second chamber 22 so as to allow gas to be supplied to the second chamber 22. The first chamber 21 has a guide portion 25 that is disposed opposite to a sewn part of the tether 24 such that the tether 24 can be inserted through the guide portion 25.

As shown in FIG. 2A, the first chamber 21 is formed by superimposing a pair of a first panel 211 and a second panel 212 capable of forming a part of the outer shape of the airbag 2, and sewing together the peripheries thereof. In a part of the outer shape of the first panel 211 and the second panel 212, protruded portions 211a and 212a protruded toward the second chamber 22 are formed at the same position. The protruded portions 211a and 212a may be formed so as to taper from the proximal end toward the distal end.

As shown in FIG. 2B, a nozzle 23 that forms an elongate flow path capable of connecting the first chamber 21 and the second chamber 22 is formed by not sewing together the distal ends of the protruded portions 211a and 212a (by forming an unsewn part) when sewing together the peripheries of the first panel 211 and the second panel 212. By forming the nozzle 23 such that it tapers from the proximal end toward the distal end, the nozzle 23 can be easily to sealed when the nozzle 23 is retracted into the first chamber 21. The sewn parts are shown by thin dotted lines.

Since the flow path connecting the first chamber 21 and the second chamber 22 is formed by the nozzle 23, the flow path connecting the first chamber 21 and the second chamber 22 is made easier to be sealed compared to a lid member of a bent hole used in a typical airbag. The nozzle 23 may be formed of a base fabric different from the first panel 211 and the second panel 212 and may be sewn to the first panel 211 and the second panel 212, or the nozzle 23 may be a cylindrical one having a constant diameter throughout the length thereof.

A first end 24a of the tether 24 is sewn to the occupant side of the first chamber 21 (for example, the second panel 212), and a second end 24 of the tether 24 is sewn to the occupant side of the nozzle 23 (for example, the protruded portion 212a of the second panel 212), and the guide portion 25 is disposed on the vehicle structure side of the first chamber 21 (for example, the first panel 211). As described above, by connecting the first end 24a and the second end 24b of the tether 24 to the same base fabric (the second panel 212 disposed on the occupant side) and disposing the intermediate guide portion on the opposite base fabric (the first panel 211 on the vehicle structure side), the flow path formed by the nozzle 23 can be easily sealed when the nozzle 23 is retracted into the first chamber 21 by the tether 24. In FIG. 2B, for convenience of explanation, the depiction of the sewn part of the second end 24b of the tether 24 is omitted.

The tether 24 is, for example, a band-like component formed of the same material as the base fabric forming the first panel 211 and the second panel 212. As shown in FIG. 2A, the first end 24a and the second end 24b of the tether 24 are sewn, for example, to the same second panel 212, and the first end 24a and the second end 24b are sewn to the protruded portion 212a and the substantially central part of the second panel 212, respectively.

In the substantially central part of the first panel 211, a guide portion 25 forming an insertion portion, for example, by sewing both ends of a strip-like base fabric to the first panel 211 is formed. As shown in FIG. 2A, the middle part of the tether 24 is inserted through this guide portion 25. For example, the tether 24 is connected to the airbag 2 by sewing the second end 24b to the second panel 212, then inserting the first end 24a through the guide portion 25, and sewing the first end 24a to the second panel 212.

The configuration of the tether 24 is not limited to that illustrated in the figures. For example, the first end 24a may be sewn to the protruded portion 211a of the first panel 211, the second end 24b may be sewn to the first panel 211, the guide portion 25 may be omitted, and a plurality of guide portions 25 may be disposed.

The second chamber 22 is formed into a bag shape by folding a panel 221 having recessed portions 221a at the top and bottom of the central part in half and being sewn to the surface of the first chamber 21 as shown in FIGS. 3A and 3B. For example, a first end 221b in the horizontal direction of the panel 221 is sewn to the surface of the first panel 211 forming the first chamber 21, and a second end 221c in the horizontal direction of the panel 221 is sewn to the surface of the second panel 212 forming the first chamber 21. The other peripheral parts of the panel 221 are sewn together by sewing together superimposed parts as shown in FIG. 3B, and a second chamber 22 is formed on the outer side of the first chamber 21.

Owing to such a configuration, the amount of the base fabric forming the second chamber 22 can be reduced, the airbag 2 can be reduced in weight, and the package in a folded state can be reduced in size. The second chamber 22 may be configured so as to cover the entire first chamber 21.

The second chamber 22 may have one or more vent holes 221d through which gas can be vented to the outside. The one or more vent holes 221d for example a plurality of vent holes, are formed in the fold in the substantially central part of the panel 221. By forming the vent holes 221d near the fold of the panel 221, gas can be vented forward from the airbag 2, and the contact of gas with the occupant can be prevented. In addition, as shown in FIG. 3B, by shifting the vent holes 221d toward the vehicle structure side (toward the second panel 212 of the first chamber 21) from the central part of the fold, the contact of gas with the occupant can be effectively prevented.

The airbag 2 according to this embodiment is configured such that, as shown in FIG. 3B, after gas is supplied to the first chamber 21 and the nozzle 23 is opened, gas is supplied to the second chamber 22, and the gas in the second chamber 22 can be vented through the vent holes 221d to the outside. Therefore, in order to supply gas from the nozzle 23 to the second chamber 22 to efficiently inflate and deploy the second chamber 22, it is preferable that the vent holes 221d be not disposed on an extended line of the nozzle 23. However, this embodiment is not limited to such a configuration. Depending on the size of the vent holes 221d or the volume of the second chamber 22, the vent holes 221d may be disposed on an extended line of the nozzle 23.

The inflator 3 is a gas generator that generates gas to be supplied to the airbag 2, and for example, has a substantially cylindrical outer shape. The inflator 3 is connected to an attachment portion formed in the first chamber 21 with fasteners such as bolts (not shown), and is housed in an airbag case together with the airbag 2. When housed in the airbag case, the airbag 2 is folded by a predetermined folding method (bellows folding, roll folding, a combination of these, or the like), and the inflator 3 is fixed to the airbag case.

At this time, the nozzle 23 is preferably folded and housed in a state retracted into the first chamber 21 as shown in FIG. 3C. By housing the nozzle 23 in a closed state at first, the venting of gas can be prevented until the nozzle 23 is retracted into the first chamber 21 by the tether 24, and the first chamber 21 can be effectively inflated and deployed. FIG. 3C illustrates a state where the nozzle 23 is retracted into the first chamber 21. In that state, the airbag 1 is folded by a predetermined folding method and is housed in the airbag case.

The inflator 3 is connected to an ECU (electronic control unit) (not shown), and is controlled on the basis of the measurement value of an acceleration sensor or the like. When the ECU senses a collision of the vehicle, the inflator 3 is ignited by ignition current from the ECU, generates gas by burning a propellant stored in the inflator 3, and supplies the gas to the first chamber 21. The airbag 2 starts inflation and deployment in the airbag case, breaks through or pushes aside a portion to be torn (not shown) formed in the seat, and is expelled into the cabin.

As shown in FIG. 1A, the nozzle 23 of the airbag 2 expelled into the cabin is sealed, therefore gas is actively supplied to the first chamber 21, and the airbag 2 inflates and deploys in the front-rear direction and the width direction while keeping the internal pressure.

As shown in FIG. 1B, during or after the inflation and deployment of the first chamber 21, and when, owing to the contact with the occupant or the like, external force F is applied from the outside of the first chamber 21, the gas in the first chamber 21 tries to escape through the nozzle 23 to the second chamber 22. The width of the first chamber 21 is reduced by the external force F, the tether 24 is thereby slacked, and the force retracting the nozzle 23 (tension) decreases.

As a result, the nozzle 23 is gradually expelled toward the second chamber 22. When a predetermined external pressure is finally reached, as shown in FIG. 1B, the nozzle 23 is completely expelled into the second chamber 22, the first chamber 21 and the second chamber 22 communicate with each other, and gas is supplied to the second chamber 22. Therefore, the internal pressure of the first chamber 21 can be reduced, and the impact on the contacting occupant or the like can be cushioned.

Even when the occupant or the like is pressed against the airbag 2, gas can be vented to the outside through the vent holes 221d formed in the second chamber 22, and the impact on the contacting occupant or the like can be cushioned by reducing the internal pressure of the airbag 2.

Figure 4A:
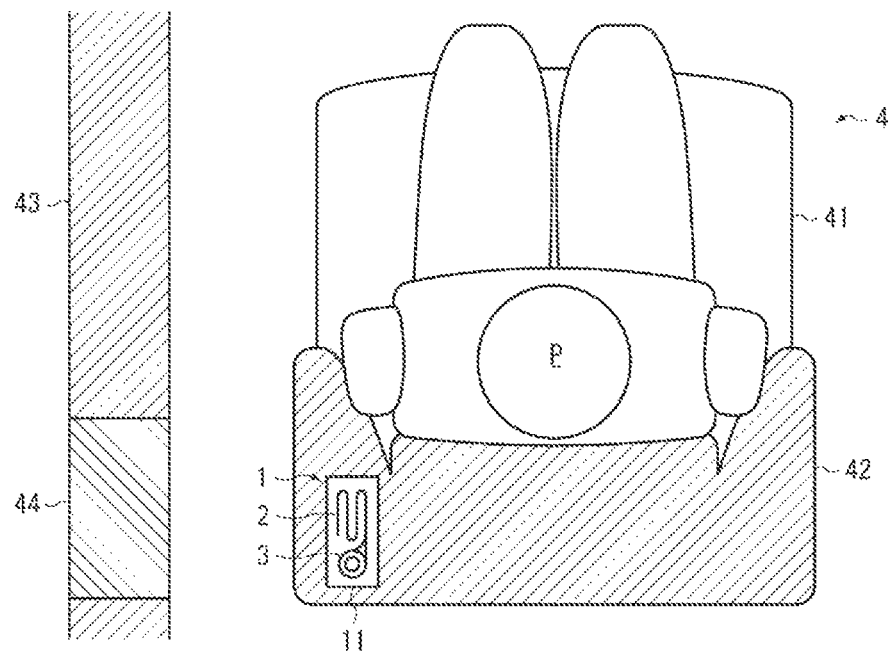
FIGS. 4A and 4B show the operation of the airbag shown in FIGS. 1A and 1B.
Figure 4B:
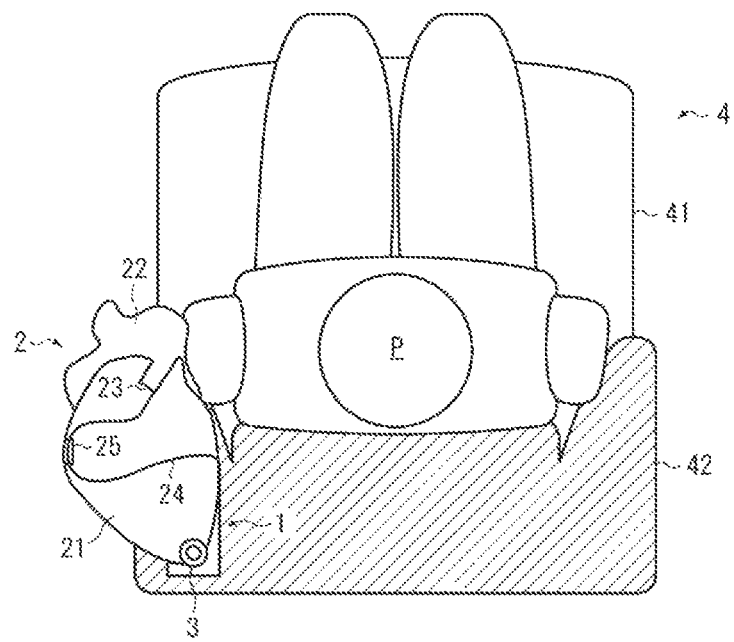
Figure 5A:
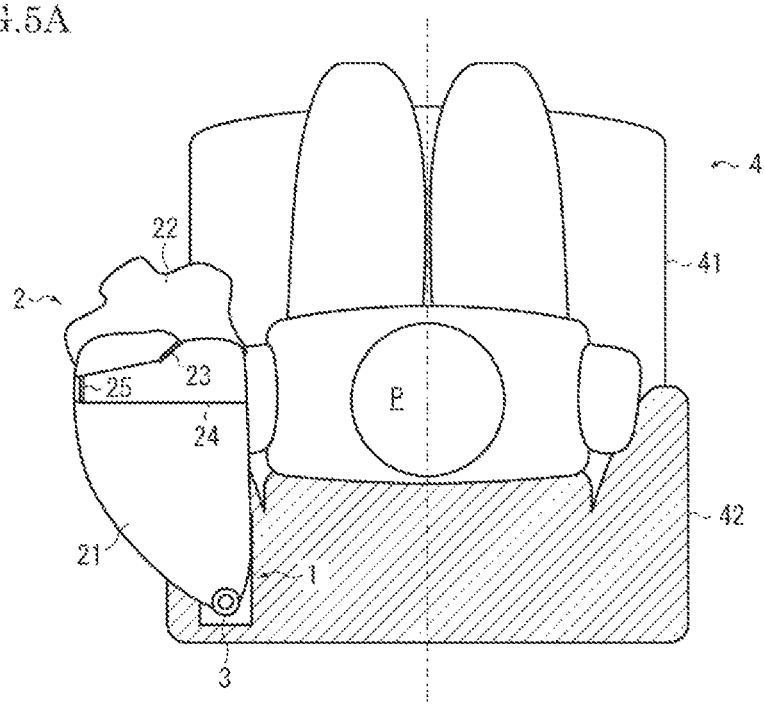
FIGS. 5A and 5B show the operation of the airbag shown in FIGS. 1A and 1B.
Figure 5B:
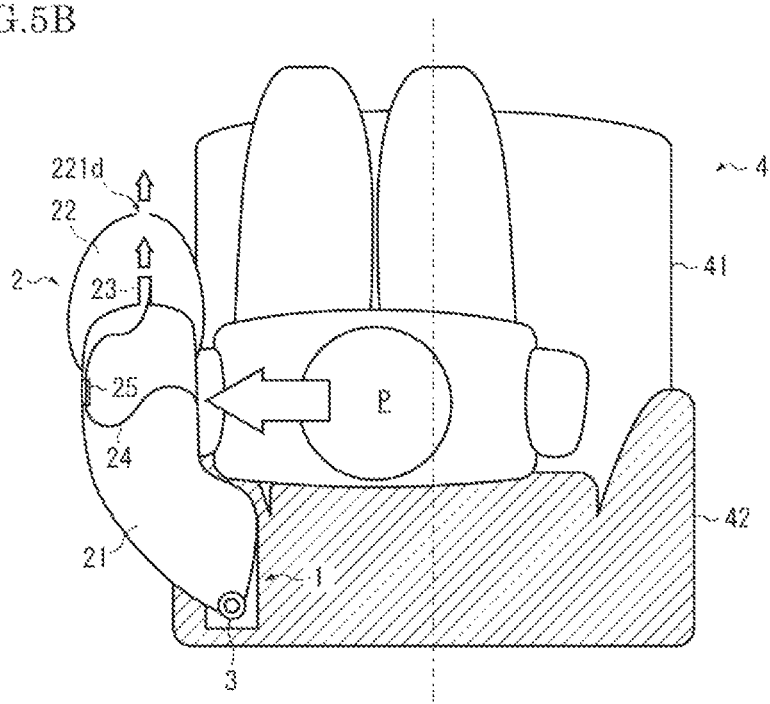

Next, the operation in the case where the above-described airbag 2 is applied to a side airbag will be described in detail with reference to FIG. 4A to FIG. 5B. Here, FIGS. 4A and 4B show the operation of the airbag shown in FIGS. 1A and 1B. FIG. 4A shows a normal state, and FIG. 4B shows the initial stage of inflation and deployment. FIGS. 5A and 5B show the operation of the airbag shown in FIGS. 1A and 1B. FIG. 5A shows an initial restrained state, and FIG. 5B shows an external pressure generating state. The same reference signs will be used to designate the same components as those in the embodiment shown in FIGS. 1A and 1B, and redundant description will be omitted. In each figure, a cross-section of the back portion (seat back) is shown.

As shown in FIGS. 4A and 4B, a seat 4 of a vehicle has a seat portion 41 on which an occupant P is seated, and a seat back 42 disposed behind the seat portion 41. Vehicle structures (a door portion 43 and a pillar 44) are often disposed beside the seat 4. In FIG. 4B to FIG. 5B, for convenience of explanation, the depiction of the vehicle structures (door portion 43 and pillar 44) is omitted.

The airbag device 1 according to this embodiment is, for example, a side airbag device in which an airbag 2 is inflated and deployed between the occupant P and the door portion 43, and is disposed in a seat 4 such as a front seat (a driver's seat and a passenger seat) or a rear seat. Specifically, the airbag 2 is housed in a folded state in the airbag case 11, and is fixed in the side part on the door portion 43 side of the seat back 42. Although not shown, a portion to be torn for expelling the airbag 2 may be formed in a part of the seat back 42 in front of the airbag case 11.

For example, in the case where the vehicle collides, as shown in FIG. 4B, gas is supplied from the inflator 3 into the first chamber 21, and the airbag 2 breaks through or pushes aside the seat back 42 and is expelled into the cabin. At this time, the nozzle 23 is retracted into the first chamber 21 and is sealed, therefore the first chamber 21 is efficiently inflated and deployed by gas supplied by the inflator 3, and the internal pressure can be kept high. Therefore, according to the airbag device 1 according to this embodiment, the airbag 2 can be quickly expelled into the cabin.

Gas is further supplied into the first chamber 21 of the airbag 2 expelled into the cabin, and the airbag 2 transits to a state where inflation and deployment are completed as shown in FIG. 5A. When the occupant P is normally seated, the airbag 2 is generally inflated and deployed without being subjected to excessive external force. Therefore, as shown, the tether 24 is in a tight state between the inner surface of the first chamber 21 and the nozzle 23, and a state where the nozzle 23 is retracted into the first chamber 21 and is sealed can be kept. Therefore, until the occupant P comes into contact with the first chamber 21, the airbag 2 quickly inflates and deploys between the occupant P and the door portion 43 and quickly transits to a completed state.

After that, as shown in FIG. 5B, when the occupant P moves toward the door portion 43 and comes into contact with the first chamber 21, a large external force is applied to the airbag 2, and the internal pressure of the first chamber 21 increases. Owing to the contact with the occupant P, the width of the first chamber 21 decreases, and the tight state of the tether 24 is released and slack occurs. With the increase in the internal pressure of the first chamber 21 and the occurrence of slack of the tether 24, the nozzle 23 is expelled toward the second chamber 22. When a predetermined external pressure is loaded on the first chamber 21, the nozzle 23 is completely expelled into the second chamber 22, and the gas in the first chamber 21 is supplied into the second chamber 22. Therefore, the impact on the occupant P in contact with the first chamber 21 is cushioned.

When gas is supplied to the second chamber 22, the second chamber 22 inflates and deploys, the contact area with the occupant P can be increased, and the restraining force of the airbag 2 can be improved. When the external force loaded on the airbag 2 increases further, the gas in the airbag 2 is finally vented through the vent holes 221d to the outside.

Although not shown, even when the first chamber 21 comes into contact with the occupant P before completing inflation and deployment, the internal pressure of the first chamber 21 increases, and the tether 24 slacks owing to the deformation of the first chamber 21. When a predetermined external pressure is loaded on the first chamber 21, the nozzle 23 is completely expelled into the second chamber 22, the increase in the internal pressure of the first chamber 21 can be prevented, and the impact on the occupant P can be cushioned.

According to the airbag 2 and the airbag device 1 according to this embodiment, in the initial stage of inflation and deployment of the airbag 2, the nozzle 23 supplying gas to the second chamber 22 is retracted into the first chamber 21 and the flow path is sealed; after the airbag 2 is expelled into the cabin, and when a predetermined external force is loaded on the first chamber 21, the nozzle 23 is expelled into the second chamber 22 and the first chamber 21 and the second chamber 22 are made to communicate with each other so that the gas in the first chamber 21 can be supplied to the second chamber 22; therefore, the internal pressure of the airbag 2 in the initial stage of inflation and deployment can be kept high.

Therefore, wasteful supply of gas can be prevented, and the power and size of the inflator 3 can be reduced.

The present invention is not limited to the above-described embodiment, and can also be applied to airbags other than side airbags, and it is understood that various changes may be made without departing from the spirit of the present invention.

What is claimed is:

1. An airbag that is normally housed in a folded state in a vehicle structure and is inflated and deployed with supply of gas in an emergency, the airbag comprising:
   a first chamber at a first end of which an inflator supplying the gas is disposed; and
   a second chamber disposed at a second end of the first chamber,
   the first chamber including a nozzle forming a flow path capable of communicating with the second chamber, a tether connecting the inner surface of the nozzle and the inner surface of the first chamber, and a guide portion that is disposed opposite to a sewn part of the tether such that the tether can be inserted through the guide portion,
   wherein, during the inflation and deployment of the first chamber, the supply of gas to the second chamber is prevented by retracting the nozzle into the first chamber, and after the first chamber is expelled into a cabin and when a predetermined external pressure is loaded on the first chamber, the nozzle is expelled into the second chamber so as to allow gas to be supplied to the second chamber.

2. The airbag according to claim 1, wherein a first end of the tether is sewn to the occupant side of the first chamber, and a second end of the tether is sewn to the occupant side of the nozzle, and the guide portion is disposed on the vehicle structure side of the first chamber.

3. The airbag according to claim 1, wherein the nozzle is folded and housed in a state retracted into the first chamber.

4. The airbag according to claim 1, wherein the second chamber has a vent hole through which gas can be vented to the outside.

5. The airbag according to claim 4, wherein the vent hole is not disposed on an extended line of the nozzle.

6. The airbag according to claim 1, wherein the airbag is a side airbag that is inflated and deployed between an occupant and a door portion.

7. An airbag device comprising an airbag that is normally housed in a folded state in a structure of a vehicle and that is inflated and deployed in an emergency, and an inflator that supplies gas to the airbag, wherein the airbag is the airbag according to claim 1.

8. An airbag that is normally housed in a folded state in a vehicle structure and is inflated and deployed with supply of gas in an emergency, the airbag comprising:
   a first chamber at a first end of which an inflator supplying the gas is disposed; and
   a second chamber disposed at a second end of the first chamber,
   the first chamber including a nozzle forming a flow path capable of communicating with the second chamber, and a tether connecting the inner surface of the nozzle and the inner surface of the first chamber,
   the second chamber is formed into a bag shape by being sewn to the surface of the first chamber,
   wherein, during the inflation and deployment of the first chamber, the supply of gas to the second chamber is prevented by retracting the nozzle into the first chamber, and after the first chamber is expelled into a cabin and when a predetermined external pressure is loaded on the first chamber, the nozzle is expelled into the second chamber so as to allow gas to be supplied to the second chamber.

9. The airbag according to claim 8, wherein the second chamber has a vent hole through which gas can be vented to the outside.

10. The airbag according to claim 9, wherein the vent hole is not disposed on an extended line of the nozzle.

11. The airbag according to claim 8, wherein the airbag is a side airbag that is inflated and deployed between an occupant and a door portion.

12. An airbag device comprising an airbag that is normally housed in a folded state in a structure of a vehicle and that is inflated and deployed in an emergency, and an inflator that supplies gas to the airbag, wherein the airbag is the airbag according to claim 8.

\* \* \* \* \*